United States Patent
Zhang et al.

(10) Patent No.: US 11,744,236 B2
(45) Date of Patent: Sep. 5, 2023

(54) MAGNETIC BRAKING MECHANISM, BAIT CASTING REEL AND FISHING TOOL

(71) Applicant: Shenzhen Bosaidong Technology Co., Ltd., Guangdong (CN)

(72) Inventors: Yunting Zhang, Guangdong (CN); Liang Huang, Guangdong (CN)

(73) Assignee: Shenzhen Bosaidong Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/584,431

(22) Filed: Jan. 26, 2022

(65) Prior Publication Data
US 2023/0116392 A1    Apr. 13, 2023

(30) Foreign Application Priority Data

Oct. 13, 2021   (CN) .......................... 202111191390.1

(51) Int. Cl.
*A01K 89/01*   (2006.01)
*A01K 89/0155*   (2006.01)

(52) U.S. Cl.
CPC .............................. *A01K 89/01555* (2013.01)

(58) Field of Classification Search
CPC ........ A01K 89/01555; A01K 89/01557; A01K 89/056
See application file for complete search history.

(56) References Cited

U.S. PATENT DOCUMENTS

| | | | |
|---|---|---|---|
| 4,601,438 A * | 7/1986 | Young | A01K 89/01555 310/105 |
| 5,692,693 A | 12/1997 | Yamaguchi | |
| 6,126,105 A | 10/2000 | Yamaguchi | |
| 9,635,843 B2 * | 5/2017 | Ikebukuro | A01K 89/045 |
| 10,231,446 B2 * | 3/2019 | Toake | A01K 89/056 |
| 2009/0026300 A1 * | 1/2009 | Tsutsumi | A01K 89/01555 242/288 |
| 2009/0127367 A1 * | 5/2009 | Tsutsumi | A01K 89/01555 242/286 |
| 2020/0236918 A1 | 7/2020 | Hyun | |
| 2022/0174926 A1 | 6/2022 | Huang et al. | |

FOREIGN PATENT DOCUMENTS

| | | | | |
|---|---|---|---|---|
| CN | 105875543 A | | 8/2016 | |
| CN | 206354238 U | | 7/2017 | |
| CN | 111328778 A | * | 6/2020 | ........... A01K 89/015 |
| CN | 210695589 U | | 6/2020 | |
| CN | 105875543 B | * | 10/2020 | ....... A01K 89/01555 |
| CN | 112471092 A | | 3/2021 | |
| JP | 2001017041 A | | 1/2001 | |

* cited by examiner

*Primary Examiner* — Emmanuel M Marcelo

(57) ABSTRACT

Disclosed is a magnetic braking mechanism which includes a spool, a magnetic braking assembly arranged on a side of the spool, the magnetic braking assembly includes a magnet assembly for generating magnetic induction lines and a centrifugal adjusting assembly for automatically adjusting a spacing between the magnet assembly and an inner wall of the spool according to a rotation speed of the spool, so as to adjust range of the magnetic induction lines cut by the spool, thereby automatically adjusting magnitude of a braking force. The centrifugal adjusting assembly allows the magnet assembly to move close to or away from the inner wall of the spool in the radial direction, so as to control strength of the magnetic induction lines near the inner wall of the spool, thereby adjusting the magnitude of the breaking force. Further disclosed are a bait casting reel and a fishing tool.

21 Claims, 7 Drawing Sheets

20

MAGNETIC BRAKING MECHANISM, BAIT CASTING REEL AND FISHING TOOL

CROSS REFERENCE TO RELATED APPLICATION

The present application claims priority from Chinese patent application No. 202111191390.1 filed on Oct. 13, 2021, the entire content of which is incorporated herein by reference.

TECHNICAL FIELD

The present disclosure relates to the field of fishing tackle, and in particularly to a magnetic braking mechanism, a bait casting reel and a fishing tool.

BACKGROUND TECHNOLOGY

Fishing reel is one of the necessary fishing tackle for fishing with telescopic fishing rods. The existing magnetic braking system of fishing reel usually has a magnet assembly disposed close to an end surface of the spool, and a component for cutting the magnetic induction lines is required to be arranged on the end surface of the spool, which inevitably increases the manufacturing cost and weight of the fishing reel. Moreover, it is incapable of adjusting the braking force according to the rotation speed of the spool, thereby causing backlashes.

SUMMARY

An objective of the present disclosure is to provide a magnetic braking mechanism, a bait casting reel and a fishing tool which have a light weight, and can automatically adjust the braking force according to a rotation speed of a spool.

In order to solve the above-mentioned technical problems, an aspect of the present disclosure provides a magnetic braking mechanism which includes:

a spool; and a magnetic braking assembly arranged on a side of the spool, the magnetic braking assembly includes a magnet assembly for generating magnetic induction lines and a centrifugal adjusting assembly for automatically adjusting a spacing between the magnet assembly and an inner wall of the spool according to a rotation speed of the spool, so as to adjust a range of the magnetic induction lines cut by the spool, thereby automatically adjusting a magnitude of a braking force.

Further, the centrifugal adjusting assembly includes a spring, and the magnet assembly includes a magnet base and at least one arc magnet body consisting of a plurality of magnets. The magnet base is provided with at least one mounting base and at least one sliding base, both in an arc shape, each arc magnet body is disposed on each of the sliding base, and a bottom part of the arc magnet body is located in the spool. The sliding base is movably sleeved on the mounting base through the spring, in order to move in a radial direction under a centrifugal force or an elastic force of the spring, thereby adjusting the spacing between the arc magnet body and the inner wall of the spool when the spool is rotated.

Further, a first limiting plate extends outward from each end of the sliding base and is bent, and a second limiting plate correspondingly extends outward from each end of the mounting base. The spring is respectively arranged between the first limiting plate and the mounting base, such that the sliding base moves in the radial direction under the centrifugal force or the elastic force of the spring. The first limiting plate may be abutted against the second limiting plate to limit a position of the sliding base when the spring is compressed.

Further, a limiting block is arranged on the magnet base to limit a moving distance of the sliding base in the radial direction.

Further, the number of the arc magnet body, the mounting base, and the sliding base is two respectively, and two mounting bases are arranged around the center of the magnet base, and the spring is disposed between each end of the sliding base and each end of the mounting base.

Further, the centrifugal adjusting assembly includes a spring, and the magnet assembly includes a magnet base and at least one arc magnet body consisting of a plurality of magnets disposed on a side of the spool. The magnet base is provided with at least one mounting post and sliding base, the arc magnet body is arranged on the sliding base, and a bottom part of the arc magnet body is located in the spool, and an end of the sliding base is movably connected to the mounting post through the spring, in order to move in a circumferential direction and a radial direction under a centrifugal force or an elastic force of the spring, thereby adjusting a spacing between the arc magnet body and the inner wall of the spool when the spool is rotated.

Further, a groove is provided on a side of the mounting post, one end of the spring is located in the groove, and the other end thereof is connected to the sliding base, and a limiting post is provided at each end of the sliding base. The centrifugal adjusting assembly further includes a cover plate, an elongated limiting hole is provided on the cover plate, and the limiting post is located in and movable relative to the limiting hole, so that the sliding base moves in the circumferential direction and the radial direction under the centrifugal force or the elastic force of the spring.

Further, the magnetic braking mechanism further includes a side cover assembly, the magnetic braking assembly is arranged on the side cover assembly, and a rotation shaft of the spool passes through the magnet assembly and is accommodated in the side cover assembly.

Another aspect of the present disclosure provides a bait casting reel, which includes a reel main body, and the above-mentioned magnetic braking mechanism that is connected to the reel main body.

Yet another aspect of the present disclosure provides a fishing tool, which includes the above-mentioned bait casting reel.

Compared with the prior art, the centrifugal adjusting assembly in the present disclosure adjusts the spacing between the magnet assembly and the inner wall of the spool according to a rotation speed of the spool, that is, the magnet assembly is allowed to move close to or away from the inner wall of the spool in the radial direction, in order to control the strength of the magnetic induction lines near the inner wall of the spool, so that the range of the magnetic induction lines cut by the spool may be adjusted, which may then adjust the magnitude of the breaking force. In the present disclosure, the magnetic induction lines may be cut through the inner wall of the spool when the spool is rotating, and no component for cutting the magnetic induction lines is required to be arranged on the end surface of the spool, which may reduce weight and the manufacturing cost. Furthermore, the distance between the magnet assembly and the inner wall of the spool may vary according to the rotation speed of the spool during casting to generate braking force at various magnitudes and prevent backlashes while increasing the casting distance.

DESCRIPTION OF THE EMBODIMENTS

Figure 1:
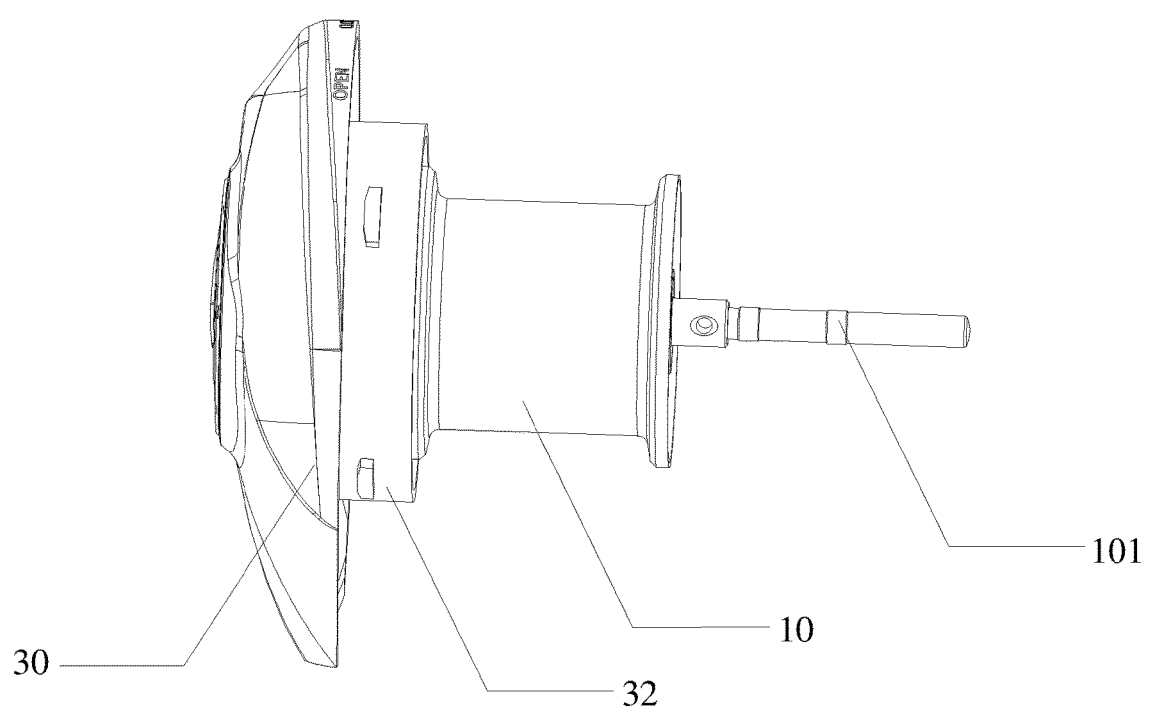
FIG. 1 is a structural view of the magnetic braking mechanism in a first embodiment of the present disclosure.

The present disclosure will be further described below in conjunction with the accompanying drawings and embodiments in order to enable those of ordinary skill in the art to more clearly understand the objectives, technical proposals, and advantages of the present disclosure.

Referring to FIGS. 1 to 4, which show a magnetic braking mechanism 1 in a first embodiment of the present disclosure, the magnetic braking mechanism 1 includes a spool 10, and a magnetic braking assembly 20 arranged on a side of the spool 10, the magnetic braking assembly 20 includes a magnet assembly for generating magnetic induction lines and a centrifugal adjusting assembly 22 for automatically adjusting a spacing between the magnet assembly and an inner wall of the spool 10 according to a rotation speed of the spool 10, so as to adjust range of the magnetic induction lines cut by the spool 10, thereby automatically adjusting magnitude of a braking force. That is, in the magnetic braking mechanism 1 of the present disclosure, the magnet assembly is allowed to move close to or away from the inner wall of the spool 10 in the radial direction when the spool 10 is rotating, in order to control the strength of the magnetic induction lines near the inner wall of the spool 10, so that the range of the magnetic induction lines cut by the spool 10 may be adjusted, which may then adjust the magnitude of the breaking force. It can be seen from the above, in the magnetic braking mechanism 1 of the present disclosure, the magnetic induction lines may be cut by the inner wall of the spool 10 as the spool 10 is rotated, hence no component for cutting the magnetic induction lines is required to be arranged on the end surface of the spool 10, which may thus reduce weight and the manufacturing cost. Furthermore, the distance between the magnet assembly and the inner wall of the spool 10 may vary according to the rotation speed of the spool 10 during casting, in order to generate braking force at various magnitudes, and prevent backlashes while increasing the casting distance and stability. This is especially suitable for fishing with small bait.

In some embodiments, the centrifugal adjusting assembly 22 includes a spring 221, and the magnet assembly includes a magnet base 211 and at least one arc magnet body 212 consisting of a plurality of magnets. The magnet base 211 is provided with at least one mounting base 2111 and at least one sliding base 213, both in an arc shape, each arc magnet body 212 is disposed on each of the sliding base 213, and a bottom part of the arc magnet body 212 is located in the spool 10. The sliding base 213 is movably sleeved on the mounting base 2111 through the spring 221, in order to move in a radial direction under a centrifugal force or an elastic force of the spring 221, thereby adjusting a spacing between the arc magnet body 212 and the inner wall of the spool 10 when the spool 10 is rotated. In the present embodiment, preferably, the sliding base 213 has a mounting slot 2132, with the arc magnet body 212 arranged therein. The magnets are sector magnets, and the two sides of every two adjacent magnets that are facing each other have opposite magnetic properties. When casting using a bait casting reel which has the magnetic braking mechanism 1 of the present disclosure, the spool 10 is rotated at a higher speed, and the arc magnet body 212 moves towards the inner wall of the spool 10 in the radial direction, so that the strength of the magnetic induction lines cut by the inner wall of the spool 10 is enhanced to provide greater braking force, which can effectively prevent backlashes of the fishing line due to the rotation speed of the spool 10 is too high. While at the end of the casting motion, the rotation speed of the spool 10 gradually decreases, and the arc magnet body 212 moves away from the inner wall of the spool 10 due to the spring 221, so that the strength of the magnetic induction lines cut by the inner wall of the spool 10 is reduced, thereby lowering the braking force and increasing the casting distance.

Figure 2:
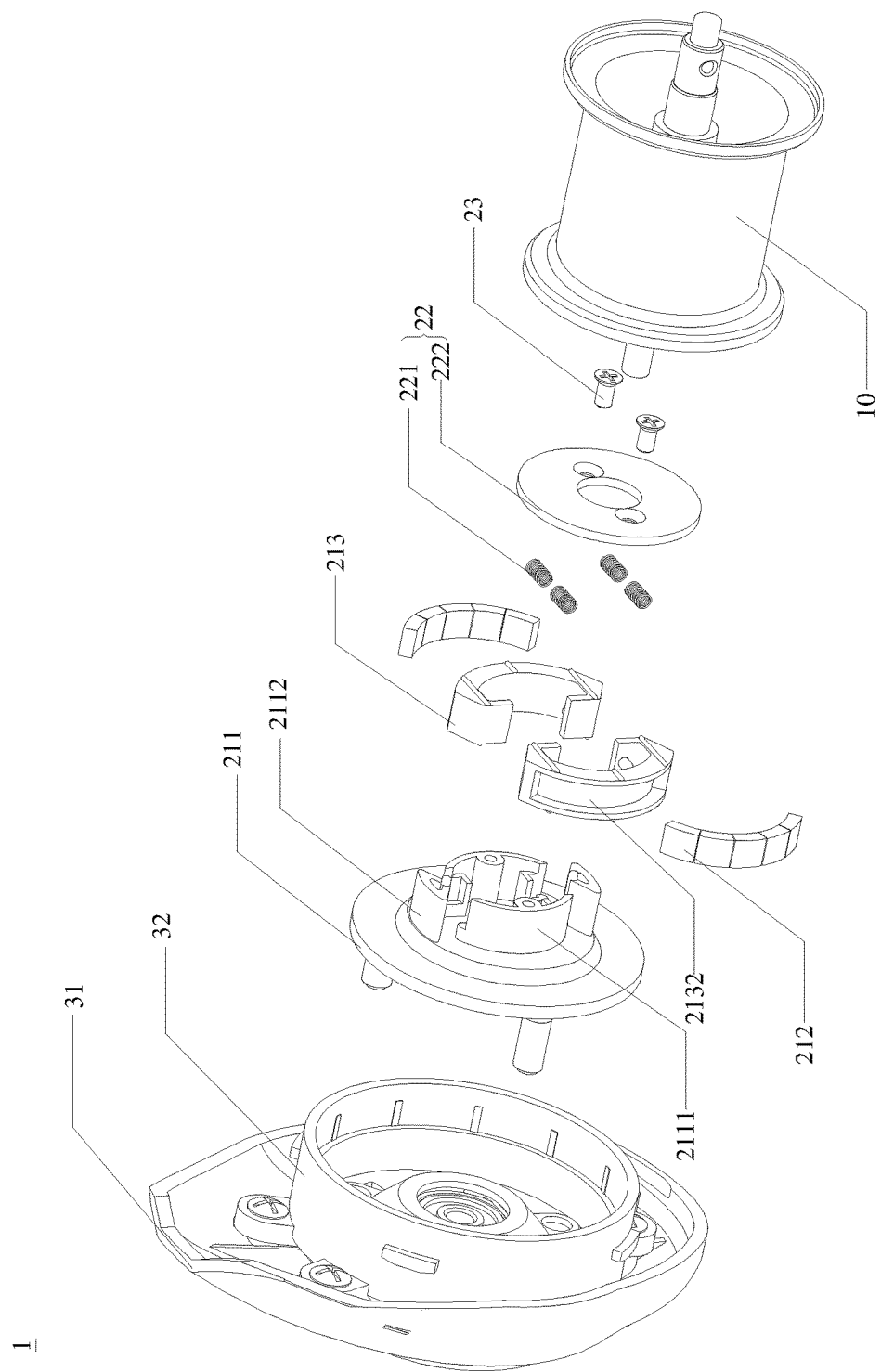
FIG. 2 is an exploded view of the magnetic braking mechanism in the first embodiment of the present disclosure.
Figure 3:
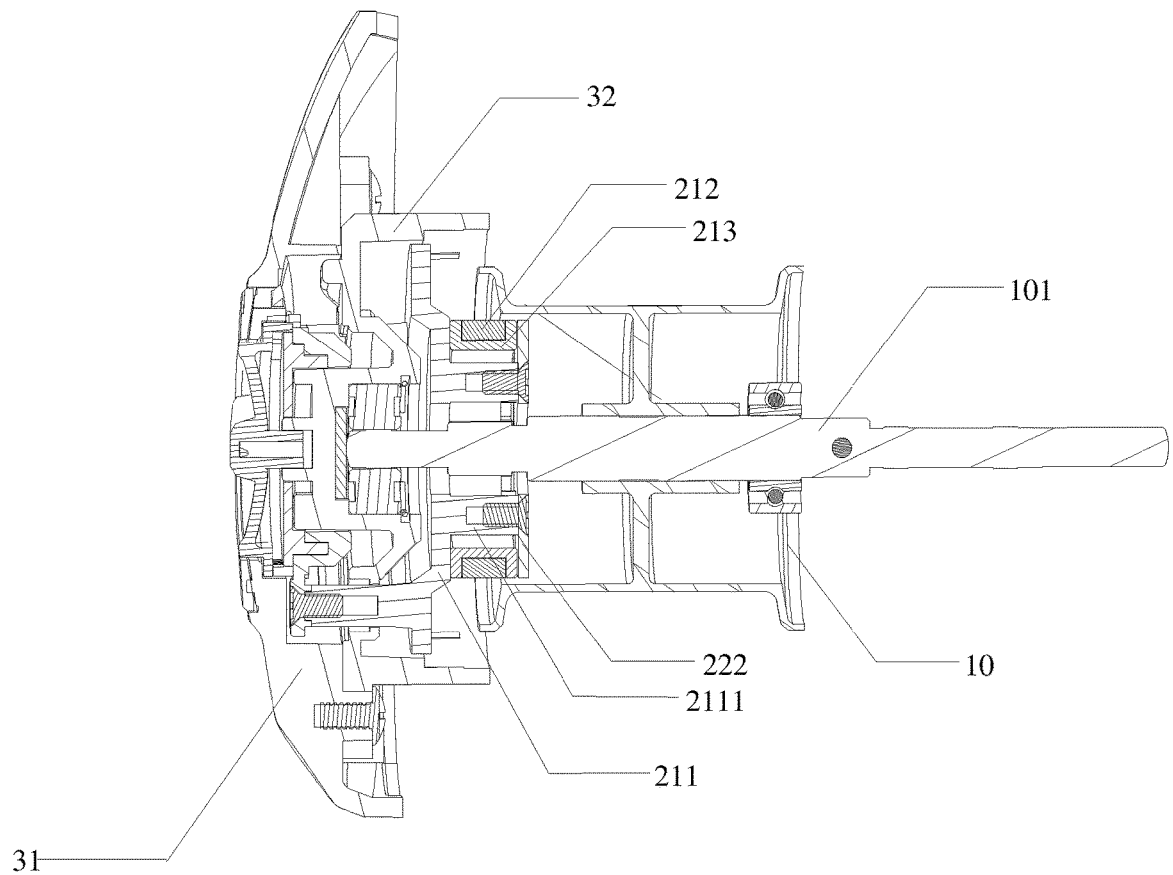
FIG. 3 is a cross-sectional view of the magnetic braking mechanism in the first embodiment of the present disclosure.
Figure 4:
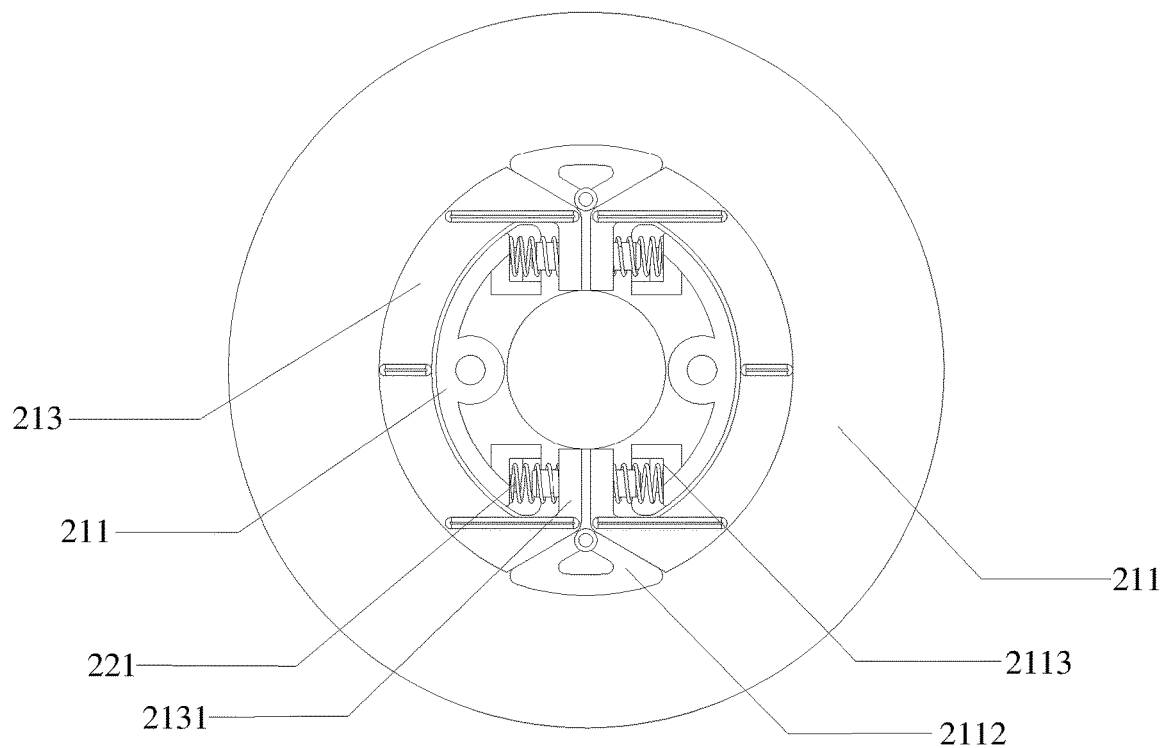
FIG. 4 is a structural view of the magnetic braking assembly in the first embodiment of the present disclosure.

Referring to FIGS. 2 to 4, in some embodiments, a first limiting plate 2131 extends outward from each end of the sliding base 213 and is bent, and a second limiting plate 2113 correspondingly extends outward from each end of the mounting base 2111. The spring 221 is arranged between the first limiting plate 2131 and the mounting base 2111, such that the sliding base 213 moves in the radial direction under the centrifugal force or the elastic force of the spring 221. The first limiting plate 2131 may be abutted against the second limiting plate 2113 when the spring 221 is compressed, so as to limit a position of the sliding base 213, and prevent the sliding base 213 from detaching. In the present embodiment, preferably, the centrifugal adjusting assembly 22 further includes a cover plate 222 located on a side of the sliding base 213 close to the spool 10, and the magnet base 211 is fixed to the cover plate 222 by screws 23. A limiting block 2112 for limiting the moving distance of the sliding base 213 in the radial direction is provided on the magnet base 211, so as to limit the sliding base 213 when the spring 221 is extended.

Specifically, in the present embodiment, the numbers of the arc magnet body 212, the mounting base 2111, and the sliding base 213 are all two, and the number of the spring 221 is four. Two mounting bases 2111 are arranged around the center of the magnet base 211, and the spring 221 is arranged between the each end of the sliding base 213 and the each end of the mounting bases 2111. One end of the spring 221 is connected to the first limiting plate 2131 of the sliding base 213, and the other end thereof is abutted against the mounting base 2111.

In some embodiments, the magnetic braking mechanism 1 further includes a side cover assembly 30, the magnetic braking assembly 20 is arranged on the side cover assembly 30, and a rotation shaft 101 of the spool 10 passes through the magnet assembly and is accommodated in the side cover assembly 30. Specifically, the side cover assembly 30 includes a side cover main body 31 and a spool base 32 connected to the side cover main body 31, and the rotation shaft 101 of the spool 10 passes through the magnet assembly and is accommodated in the spool base 32.

It can be found that, in the present embodiment, a part of the arc magnet body 212 is located in the spool 10, so that a part of the inner wall of the spool 10 near the arc magnet body 212 cuts the magnetic induction lines generated by the arc magnet body 212 when the spool 10 is rotated. This may reduce the weight of the spool 10, and the spacing between the magnet assembly and the inner wall of the spool 10 may vary. Therefore, the spool is rotated at high speed and the arc magnet body 212 moves towards the inner wall of the spool 10 along the radial direction under the centrifugal force in the beginning of the casting motion, such that the strength of the magnetic induction lines cut by the inner wall of the spool 10 is enhanced to provide greater braking force, thereby preventing backlashes of the fishing line. While at the end of the casting motion, the rotation speed of the spool 10 gradually decreases, and the arc magnet body 212 moves away from the inner wall of the spool 10 due to the spring 221, so that the strength of the magnetic induction lines cut by the inner wall of the spool 10 is reduced, thereby lowering the braking force, slowing down the decline of the rotation speed of the spool 10, and increasing the casting distance.

Figure 5:
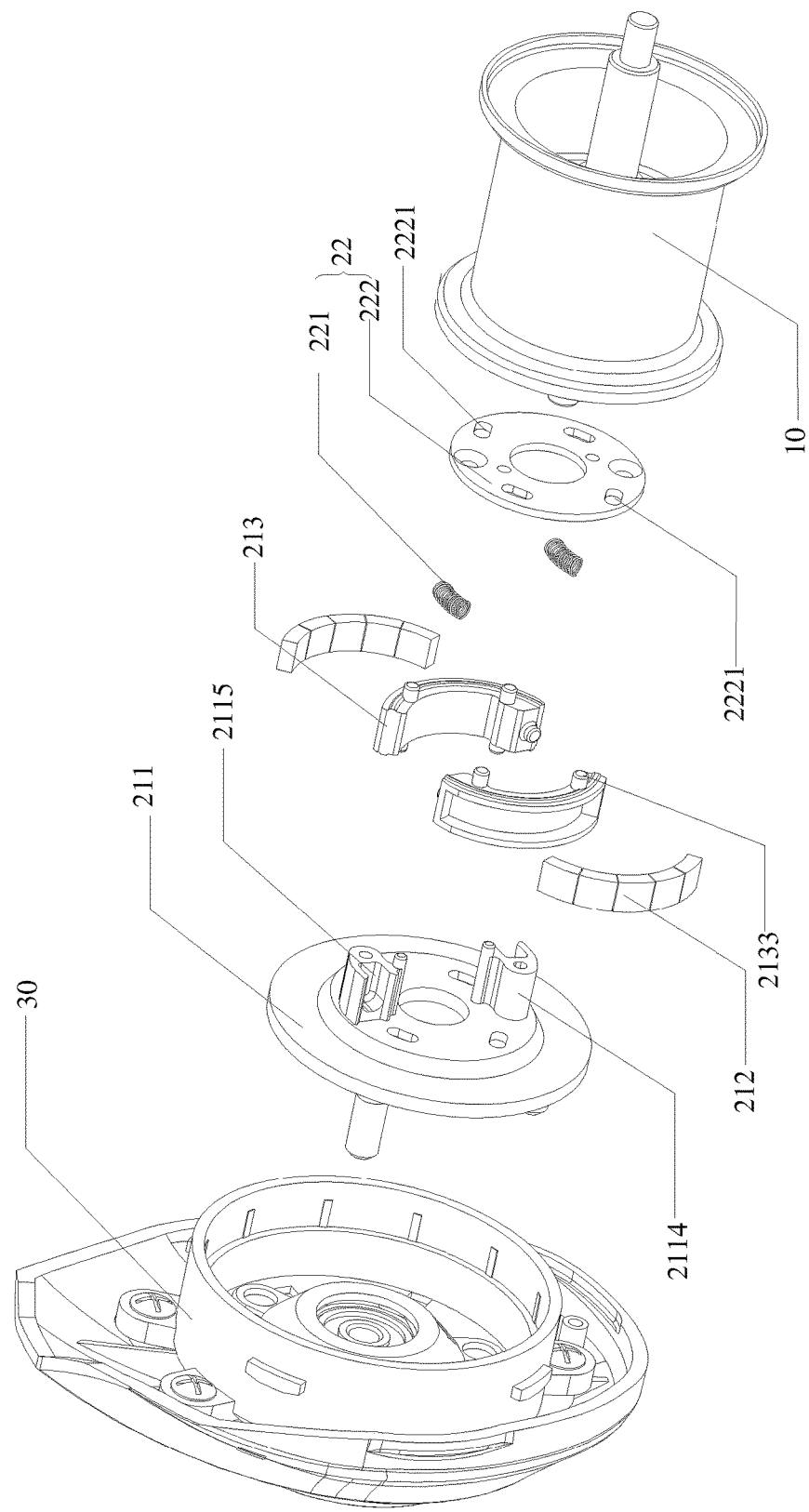
FIG. 5 is an exploded view of the magnetic braking mechanism in a second embodiment of the present disclosure.
Figure 6:
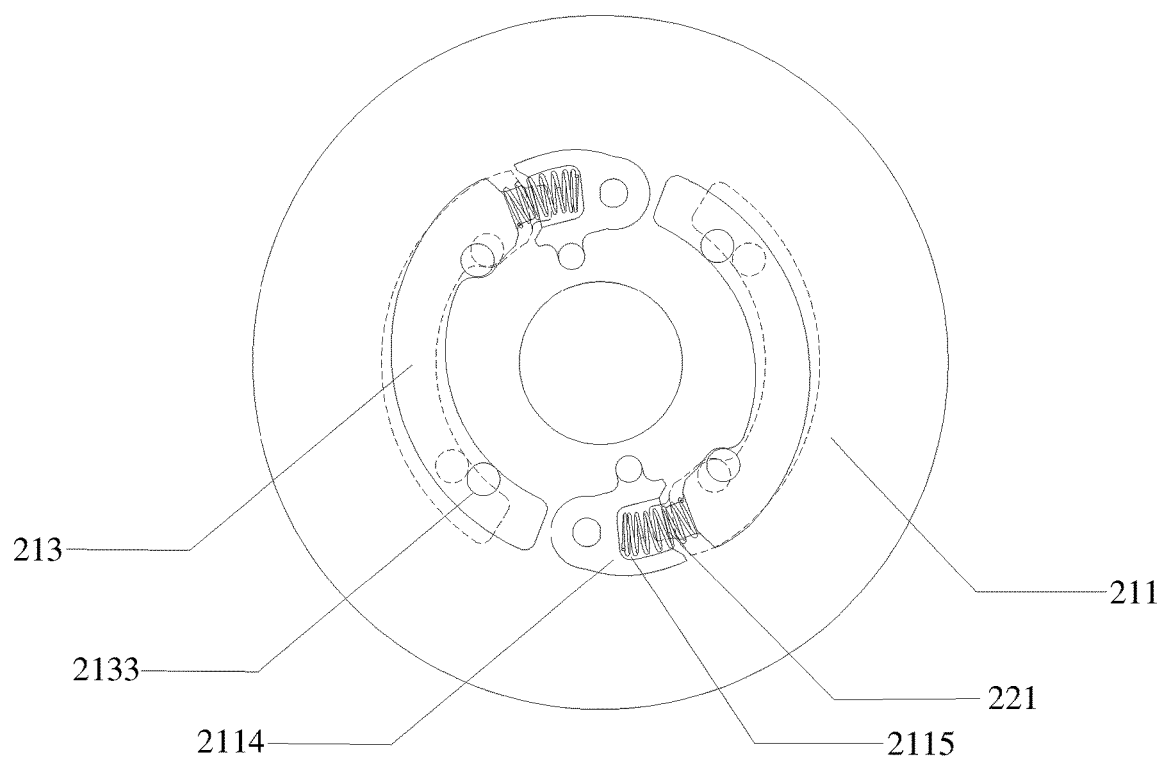
FIG. 6 is a structural view of the magnetic braking assembly in the second embodiment of the present disclosure.

Referring to FIGS. 5 to 6, which show a magnetic braking mechanism 1 in a second embodiment of the present disclosure, the cover plate 222 of the magnetic braking assembly 20 is not shown in FIG. 6 in order to demonstrate a connection relationship between the sliding base 213 and the mounting post 2114. The difference between this embodiment and the first embodiment is that the specific structure and connection relationship of the centrifugal adjusting assembly 22 and the magnet base 211 are different, and other structures are the same or similar. In this embodiment, the centrifugal adjusting assembly 22 includes a spring 221. The magnet assembly includes a magnet base 211 and at least one arc magnet body 212 consisting of a plurality of magnets, disposed on a side of the spool 10. The magnet base 211 is provided with at least one mounting post 2114 and sliding base 213 thereon, the arc magnet body 212 is disposed on the sliding base 213, and a bottom part of the arc magnet body 212 is located in the spool 10. One end of the sliding base 213 is movably connected to the mounting post 2114 through the spring 221, in order to move in a circumferential direction and a radial direction under a centrifugal force or an elastic force of the spring 221, thereby adjusting a spacing between the arc magnet body 212 and the inner wall of the spool 10 when the spool 10 is rotated.

Specifically, in the present embodiment, the number of the arc magnet body 212, the mounting base 2111, the sliding base 213, and the spring 221 is all two. Two mounting bases 2111 are arranged around the center of the magnet base 211. A groove 2115 is provided on one side of the mounting post 2114, one end of the spring 221 is located in the groove 2115, and the other end thereof is connected to the sliding base 213, and a limiting post 2133 is provided at each end of the sliding base 213. The centrifugal adjusting assembly 22 further includes a cover plate 222, elongated limiting holes 2221 are provided on the cover plate 222, and the limiting post 2133 is located in and movable relative to each of the limiting holes 2221, so that the sliding base 213 moves in the circumferential direction and the radial direction under the centrifugal force or the elastic force of the spring 221. It can be seen that in this embodiment, the trajectory of the sliding base 213 is defined by the cooperation of the elongated limiting holes 2221 on the cover plate 222 and the limiting posts 2133. The sliding base 213 may control the strength of the magnetic induction lines around the inner wall of the spool 10 that is close to the arc magnet body 212 according to the centrifugal adjusting assembly 22, so as to adjust the magnitude of the braking force.

Figure 7:
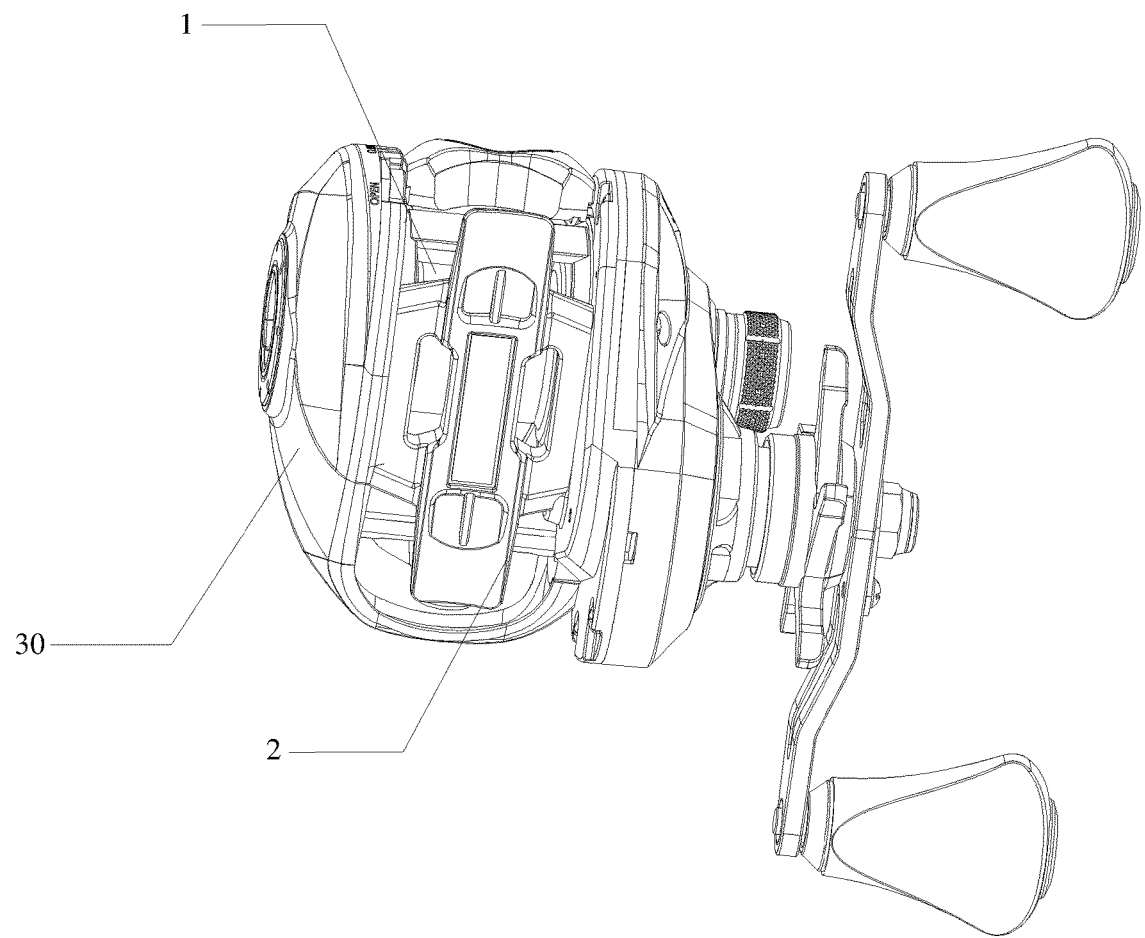
FIG. 7 is a structural view of the bait casting reel in an embodiment of the present disclosure.

Referring to FIG. 7, which shows an embodiment of a bait casting reel 100 of the present disclosure, the bait casting reel 100 includes a reel main body 2 and the magnetic braking mechanism 1 as described in the first and second embodiments. The spool 10 and the magnetic braking assembly 20 in the magnetic brake mechanism 1 may be assembled in the reel main body 2, and the side cover assembly 30 is connected to the reel main body 2. Furthermore, a fishing tool including the above-mentioned bait casting reel 100 is provided, the remaining structure of the fishing tool other than the bait casting reel 100 is the same as that of common fishing tools in the prior art, for example, with a fishing rod, fishing line, and the like. The structure is familiar to those skilled in the art, thus is not repeated herein.

The above descriptions are merely preferred embodiments of the present disclosure, and are not intended to limit the present disclosure. Various equivalent changes and modifications may be made by those skilled in the art on the basis of the above-mentioned embodiments, and all equivalent changes or modifications made within the scope of the claims shall fall within the scope of protection of the present disclosure.

What is claimed is:

1. A magnetic braking mechanism, comprising:
a spool;
a magnetic braking assembly arranged on a side of the spool, the magnetic braking assembly including a magnet assembly for generating magnetic induction lines and a centrifugal adjusting assembly for automatically adjusting a spacing between the magnet assembly and an inner wall of the spool according to a rotation speed of the spool, so as to adjust a range of the magnetic induction lines cut by the spool, thereby automatically adjusting a magnitude of a braking force;
wherein the centrifugal adjusting assembly comprises a spring, and the magnet assembly comprises a magnet base and at least one arc magnet body consisting of a plurality of magnets, the magnet base is provided with at least one mounting base and at least one sliding base both in an arc shape, each arc magnet body is disposed on each of the sliding base, and a bottom part of the arc magnet body is located in the spool, the sliding base is movably sleeved on the mounting base through the spring, in order to move in a radial direction under a centrifugal force or an elastic force of the spring, thereby adjusting the spacing between the arc magnet body and the inner wall of the spool when the spool is rotated.

2. The magnetic braking mechanism according to claim 1, wherein a first limiting plate extends outward from each end of the sliding base and is bent, and a second limiting plate correspondingly extends outward from each end of the mounting base, the spring is arranged between the first limiting plate and the mounting base, such that the sliding base moves in the radial direction under the centrifugal force or the elastic force of the spring, and the first limiting plate is abutted against the second limiting plate to limit a position of the sliding base when the spring is compressed.

3. A bait casting reel, comprising a reel main body and the magnetic braking mechanism according to claim 2, the magnetic braking mechanism being connected to the reel main body.

4. A fishing tool, comprising the bait casting reel according to claim 3.

5. The magnetic braking mechanism according to claim 1, wherein a limiting block is arranged on the magnet base to limit a moving distance of the sliding base in the radial direction.

6. A bait casting reel, comprising a reel main body and the magnetic braking mechanism according to claim 5, the magnetic braking mechanism being connected to the reel main body.

7. A fishing tool, comprising the bait casting reel according to claim 6.

8. The magnetic braking mechanism according to claim 1, wherein the number of the arc magnet body, the mounting base, and the sliding base is two respectively, and two mounting bases are arranged around the center of the magnet base, and the spring is disposed between each end of the sliding base and each end of the mounting base.

9. A bait casting reel, comprising a reel main body and the magnetic braking mechanism according to claim 8, the magnetic braking mechanism being connected to the reel main body.

10. A fishing tool, comprising the bait casting reel according to claim 9.

11. The magnetic braking mechanism according to claim 1, wherein the magnetic braking mechanism further includes a side cover assembly, the magnetic braking assembly is arranged on the side cover assembly, and a rotation shaft of the spool passes through the magnet assembly and is accommodated in the side cover assembly.

12. A bait casting reel, comprising a reel main body and the magnetic braking mechanism according to claim 11, the magnetic braking mechanism being connected to the reel main body.

13. A fishing tool, comprising the bait casting reel according to claim 12.

14. A bait casting reel, comprising a reel main body and the magnetic braking mechanism according to claim 1, the magnetic braking mechanism being connected to the reel main body.

15. A fishing tool, comprising the bait casting reel according to claim 14.

16. A magnetic braking mechanism, comprising:
a spool;
a magnetic braking assembly arranged on a side of the spool, the magnetic braking assembly including a magnet assembly for generating magnetic induction lines and a centrifugal adjusting assembly for automatically adjusting a spacing between the magnet assembly and an inner wall of the spool according to a rotation speed of the spool, so as to adjust a range of the magnetic induction lines cut by the spool, thereby automatically adjusting a magnitude of a braking force, wherein the centrifugal adjusting assembly comprises a spring, and the magnet assembly comprises a magnet base and at least one arc magnet body consisting of a plurality of magnets disposed on a side of the spool, the magnet base is provided with at least one mounting post and sliding base, the arc magnet body is arranged on the sliding base, and a bottom part of the arc magnet body is located in the spool, one end of the sliding base is movably connected to the mounting post through the spring, in order to move in a circumferential direction and a radial direction under a centrifugal force or an elastic force of the spring, thereby adjusting a spacing between the arc magnet body and the inner wall of the spool when the spool is rotated.

17. The magnetic braking mechanism according to claim 16, wherein a groove is provided on a side of the mounting post, one end of the spring is located in the groove, and the other end thereof is connected to the sliding base, and a limiting post is provided at each end of the sliding base, the centrifugal adjusting assembly further includes a cover plate, an elongated limiting hole is provided on the cover plate, and the limiting post is located in and movable relative to the limiting hole, so that the sliding base moves in the circumferential direction and the radial direction under the centrifugal force or the elastic force of the spring.

18. A bait casting reel, comprising a reel main body and the magnetic braking mechanism according to claim 17, the magnetic braking mechanism being connected to the reel main body.

19. A fishing tool, comprising the bait casting reel according to claim 18.

20. A bait casting reel, comprising a reel main body and the magnetic braking mechanism according to claim 16, the magnetic braking mechanism being connected to the reel main body.

21. A fishing tool, comprising the bait casting reel according to claim 20.

* * * * *